Figure 7:
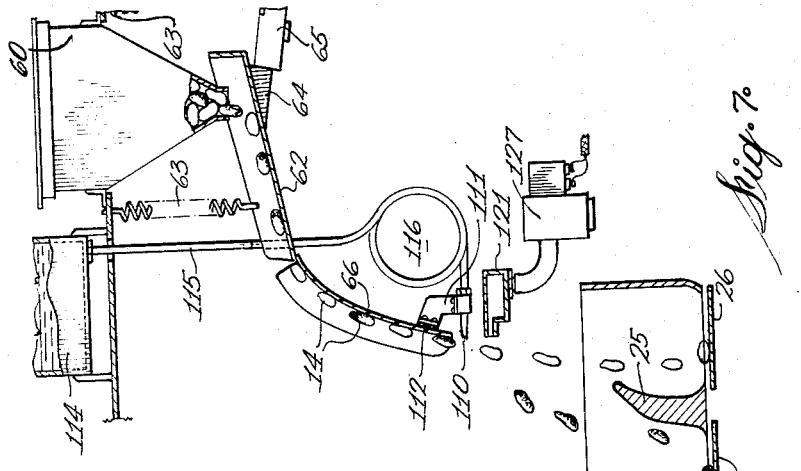

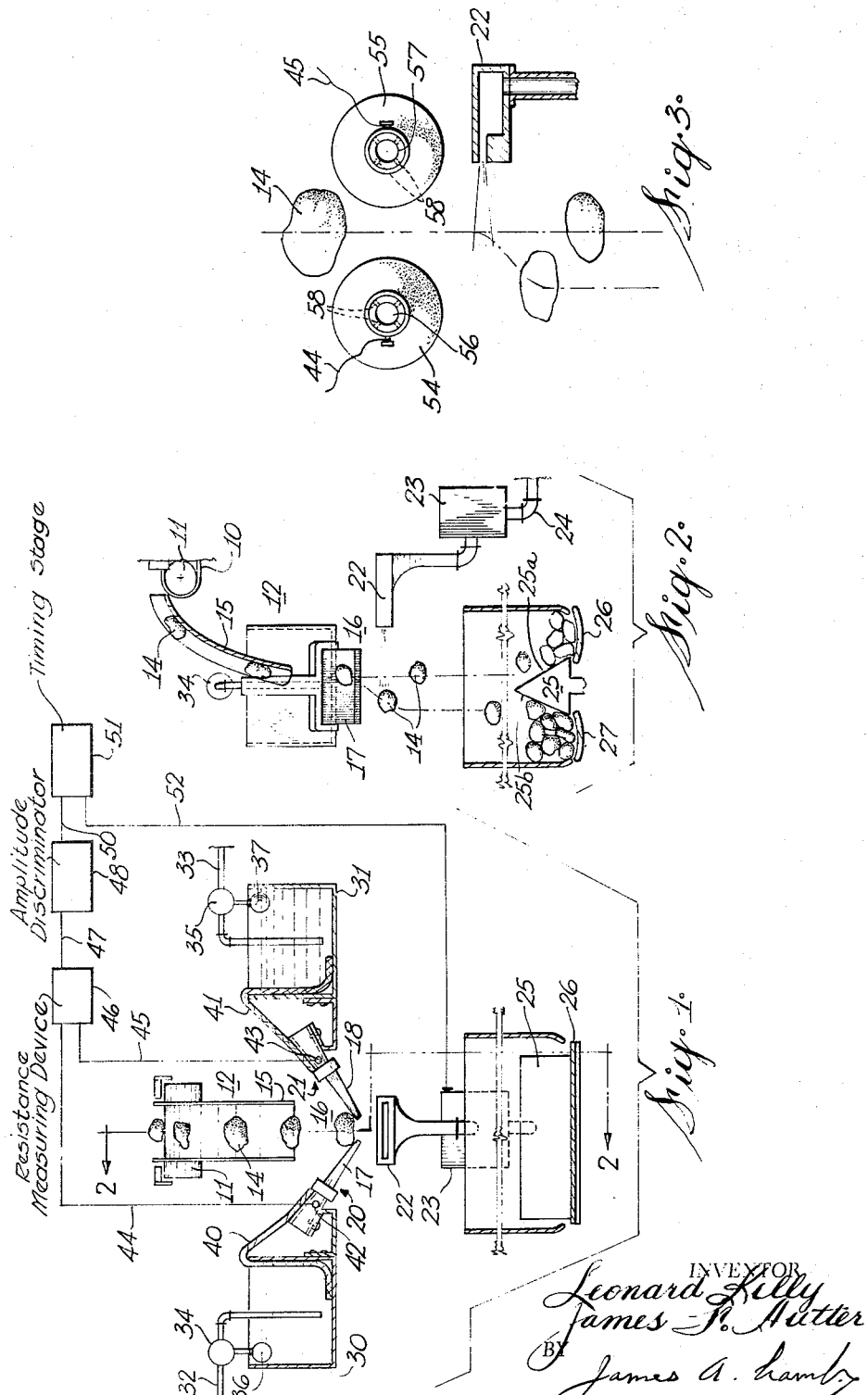

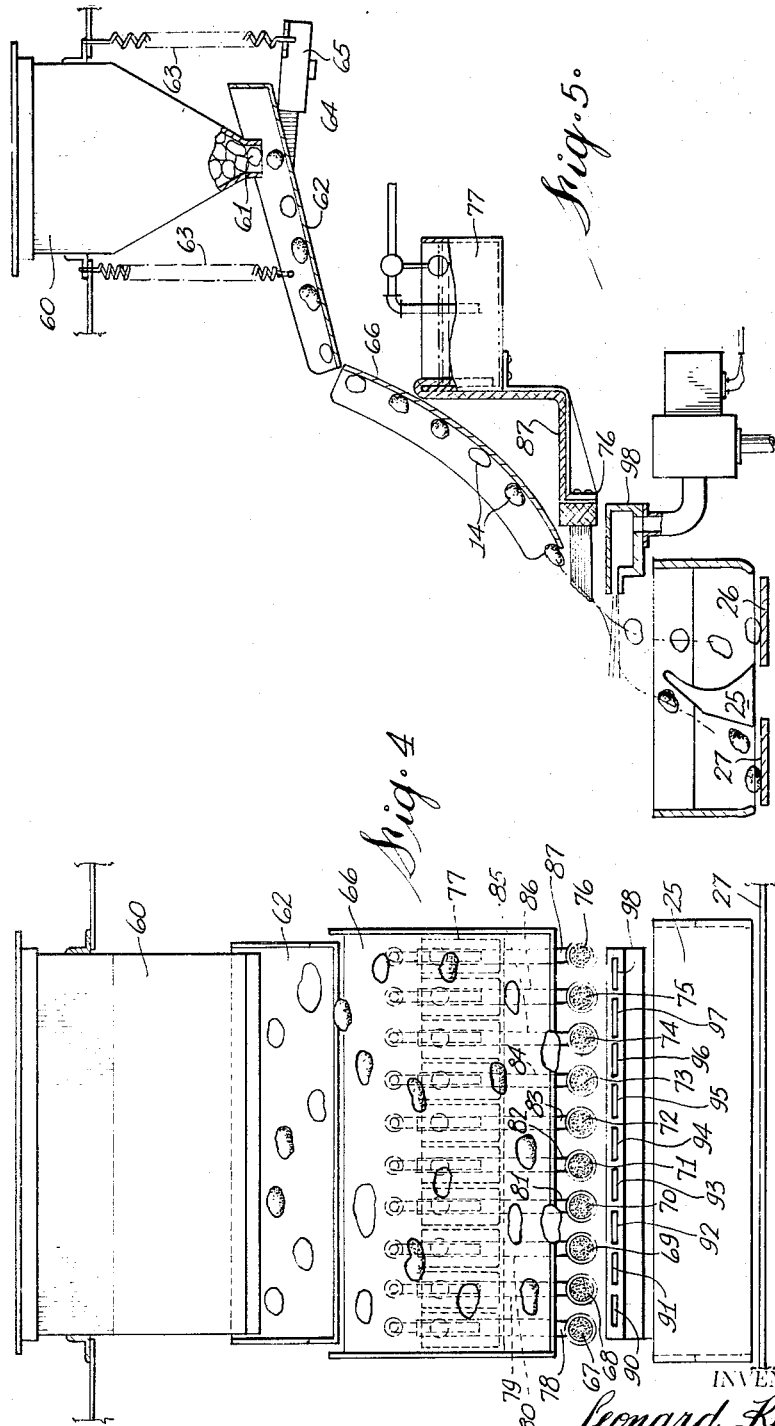

INVENTOR
Leonard Kelly
James F. Hutter
BY
James G. Hamb
PATENT AGENT

United States Patent Office 3,245,530
Patented Apr. 12, 1966

3,245,530
APPARATUS FOR DETERMINING THE RESISTANCE OF MOVING BODIES
Leonard Kelly and James F. Hutter, Bancroft, Ontario, Canada, assignors, by mesne assignments, to Sphere Investments Limited, Nassau, Bahama Islands, a corporation of the Bahama Islands
Filed Sept. 5, 1963, Ser. No. 306,938
15 Claims. (Cl. 209—81)

This application is a continuation-in-part of United States patent application Serial No. 291,975, filed July 1, 1963, and now abandoned.

This invention relates to apparatus for determining the resistance of moving bodies of material. In particular, the invention relates to apparatus for determining the resistance of irregularly shaped bodies of material moving through a sorting zone and for sorting the bodies according to their resistance.

Various kinds of apparatus are known for determining the degree or extent of a particular physical property of each of a number of bodies of material moving through the apparatus. Various apparatus are also known which sort on the basis of the determined value of the physical property. The physical properties used may, for example, be transparency, colour, specific gravity, magnetism, and others. Speaking generally, the apparatus used for determining the physical property in question are complicated and their use is limited to a very small group of materials or to a single material. Another physical property which is of interest is electrical resistance or its reciprocal, conductance. Relatively large groups of materials possess this property in amounts which are measurable in practice. Consequently, it appears that this would be a desirable basis for sorting. Attempts have been made in the past to determine the electrical resistance of moving bodies of material as a basis for sorting, but these attempts were far from satisfactory. The prior apparatus was not able to determine the resistance of the moving bodies of material rapidly or consistently, nor was the prior apparatus sufficiently simple and inexpensive for economic sorting.

It has long been known that different rock materials have different values of resistance associated with them. Also, with increasing labour costs in recent years, it has become more and more desirable to sort mechanically rock fragments having various quantities of gangue or waste mixed with ore and ore itself distributed through the fragments. Consequently, apparatus able to sort ore fragments rapidly and efficiently by means of resistance would be very desirable. The present invention sorts any bodies of material having measurable resistance values for individual bodies and is therefore particularly useful to the field of ore sorting. The invention will be discussed mainly in this connection in the following description. However, it is not the intention to limit the invention to the determination of the resistance of rock fragments and the subsequent sorting of the fragments. Where the invention is described for convenience with reference to moving rock fragments, it is intended that the invention may be applied to any bodies of material having measurable values of resistance.

Referring now generally to rocks and the sorting of rock fragments, it has been known for many years that different rocks and ores have different values of resistance associated with them, and that the resistance associated generally with any given ore may vary over a fairly wide range. Apparently, however, it was not recognized that the resistance of the ore in any particular ore body was relatively consistent, and that the reistance of the waste or gangue in any particular ore body was normally fairly consistent. Because of this little attention was given to rapid determination of rock resistance and sorting on this basis. Suitable apparatus for making such resistance measurements and for sorting rapidly and efficiently in accordance with the measurements was not available.

It has now been found that in practice in a particular ore body the resistance of the ore is usually different from the resistance of the waste by a sizeable factor as will subsequently be discussed in connection with some specific examples. Also, it has been found that in practice, particularly in the case of base metals, the resistance of a rock fragment is roughly proportional to the grade of the ore.

It is therefore an object of this invention to provide a simple, inexpensive apparatus of novel design for determining the resistance of moving bodies of material.

It is another object of this invention to provide an apparatus of simple design for determining the resistance of irregularly shaped bodies of material moving through a resistance determining zone under the influence of gravity.

It is yet another object of this invention to provide apparatus for rapidly determining the resistance of each of a number of bodies of material moving through a sorting zone and for directing the bodies towards either of two alternative destinations in accordance with the resistance value determined for that body.

Figure 6:
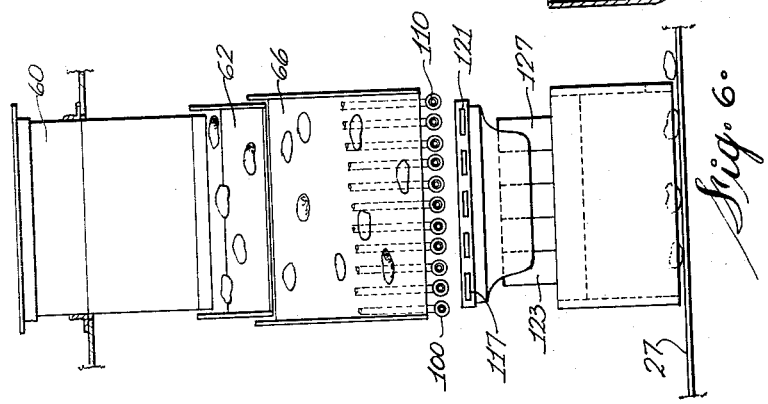
Figure 8:
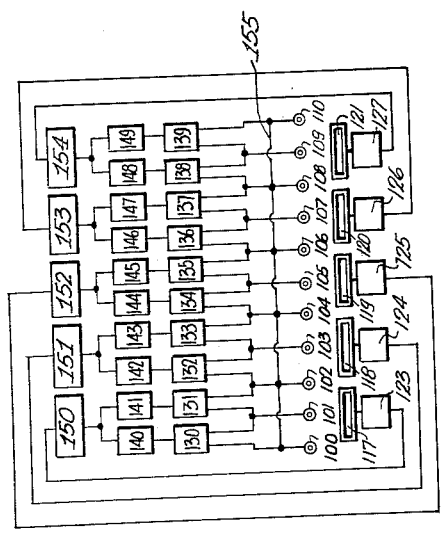

These and other objects and advantages of the invention will appear from the following description taken in conjunction with the accompanying drawings, in which:

FIGURE 1 is a front view, partly in section, of an embodiment of the invention suitable for determining resistance of bodies of material moving in single row alignment, and for sorting on the basis of the determined resistance, FIGURE 2 is a sectional side view taken along line 2—2 of FIGURE 1, FIGURE 3 is a side view of an alternate portion of apparatus for use with the apparatus of FIGURES 1 and 2, FIGURE 4 is a front view of another embodiment of the invention suitable for determining the resistance of bodies of material moving in a wide path random stream, and for sorting on the basis of the determined resistance of the bodies, FIGURE 5 is a side view, partly in section, of the apparatus of FIGURE 4, FIGURE 6 is a front view of another embodiment of the invention suitable for determining the resistance of bodies of material moving in a wide path random stream and for sorting on the basis of the determined resistance, FIGURE 7 is a side view, partly in section, of the apparatus of FIGURE 6, and FIGURE 8 is a schematic block diagram useful in explaining the operation of the apparatus of FIGURES 6 and 7.

Referring now to FIGURES 1 and 2, there is shown an ore sorting system having a conveyor including a belt 10 supported in part by an end roller 11. The belt 10 is for conveying ore fragments in single row alignment and introducing the fragments into the upper part of a sorting zone shown generally as 12. A trajectory plate 15 in sorting zone 12 is designed so that it follows approximately the path of fall of the fragments. The purpose of trajectory plate 15 is to prevent or reduce fanning out of the fragments as they leave the end of the belt 10. While some fragments may pass just clear of the plate 15 in a desired path, others graze plate 15 and are guided into the desired predetermined path.

Below plate 15 in the predetermined fragment path is a resistance determining zone indicated generally as 16 and forming part of the sorting zone. Mounted in zone 16 on opposite sides of the fragment path are two brushes 20 and 21, having flexible bristles 17 and 18, respectively, extending into the path of fragments 14. The bristles 17 and 18 have fragment engaging end portions which terminate in the path spaced from one another. The bristles 17 and 18 constitute a flexible conducting member for contacting the falling fragments 14. A resistance determining means is connected with bristles 17 and 18 for determining the resistance of fragments 14 which contact the bristles. This will be described in more detail hereinafter.

Mounted in the sorting zone 12 adjacent the predetermined path of the falling fragments and below the brushes 20 and 21, is a fluid nozzle 22. The nozzle 22 is connected through a fluid control valve 23 and a line 24 to a source of fluid under pressure. This fluid may conveniently be air under pressure. The valve 23 is controlled by a sorting signal to be in one of two conditions—open or closed. When valve 23 is open a blast of air is directed through nozzle 22 at fragments falling in their predetermined path deflecting them from the path. When valve 23 is closed, the fragments continue in their path of fall. The nozzle 22 and valve 23 thus constitute a rejection means for rejecting certain fragments. Such air blast rejection means are described in United States Patent No. 3,097,744 of James F. Hutter et al. issued July 16, 1963.

It will be obvious that a mechanical rejection means could be used in the invention. Mechanical rejection systems where plates are moved to deflect rejected pieces, or where rods push rejected pieces to one side, are relatively slow acting. They are more suitable for use in sorting systems which are slower, that is where the bodies to be sorted are not in free fall and are moving at a slower rate. Such mechanical rejection means, however, are quite suitable for use in the present invention where the rate of sorting is not as high. The use of an air blast rejection means is preferred for sorting ore fragments in free fall.

A splitter plate 25 is mounted below the rejection means to separate or divide the fragments after they pass the rejection means. The fragments which are not deflected by the air blast from nozzle 22 fall on side 25a of the splitter plate and may be carried away by a belt 26. The fragments which are deflected fall on side 25b of the splitter plate 25 and may be carried away by a belt 27.

Returning now to the resistance determining portion of the apparatus, the bristles 17 and 18 of the brushes 20 and 21 are supplied with a conducting liquid such as water. In the embodiment shown, the bristles may be of a plastic material such as nylon, for example, and the conducting path is provided by a conducting liquid such as water on the bristles. In some instances it may be desirable to use other liquids, or to use additives in the water, to increase or otherwise control the conductivity. The brushes 20 and 21 are preferably mounted with their respective bristles 17 and 18 directed or inclined inwardly and downwardly in the direction of travel of the fragments. This not only ensures an adequate supply of water on the terminating ends of the bristles but also causes a more uniform flexing of the bristles.

To supply the water to the bristles there is provided two water reservoirs 30 and 31 mounted adjacent brushes 20 and 21 respectively. Water supply conduits 32 and 33 are connected to a water source (not shown) and empty into reservoirs 30 and 31. Control valves 34 and 35 actuated by floats 36 and 37 respectively control the liquid flow through conduits 32 and 33 and maintain the water in reservoirs 30 and 31 at a desired level. Wicks 40 and 41 extend respectively from reservoirs 30 and 31 to bristles 17 and 18 to provide the water supply on the bristles.

A conductive connection is made at 42 and 43 to bristles 17 and 18, and conductors 44 and 45 are connected from 42 and 43 respectively to a resistance measuring means 46. The resistance measuring means or resistance measuring device 46 preferably includes a D.C. (direct current) power supply connected with conductors 44 and 45 whereby the current flowing from the supply through conductors 44, 45 and bristles 17, 18 and a fragment is related to the resistance (or conductance) of the fragment. Such devices and circuits are well known. The resistance measuring means 46 provides as an output a signal whose amplitude is indicative of fragment resistance, and this signal is applied via conductor 47 to an amplitude discriminator 48. The discriminator 48 is preferably adjustable with regard to its discriminating amplitude level. The function of a discriminator is well known. It provides an output only when the amplitude of an input signal exceeds a predetermined level, or if desired, as an alternative, it provides an output signal only when the input signal is less than a predetermined level. A description of such a circuit may be found, for example, in the aforementioned United States Patent No. 3,097,744.

The output of discriminator 48 is applied over conductor 50 to a timing stage 51. The timing stage 51 in turn provides a control signal to the air blast control valve 23 over conductor 52 to open and close the valve. The purpose of the timing stage 51 is to cause the valve 23 to open as soon as or immediately before the lowest part of a fragment reaches a point in front of nozzle 22, and to cause valve 23 to close just as the fragment completely passes this point. Such timing stages are known and present no problems in design. An example of a timing circuit may be found in the aforementioned United States Patent No. 3,097,744.

In the operation of the apparatus in FIGURES 1 and 2, the rock fragments 14 are introduced into the upper part of sorting zone 12 where they pass into substantially free fall. As they pass into free fall the fragments accelerate, and as each rock fragment is accelerating with respect to the following rock, the spacing between fragments increases. The increased spacing makes it easier to distinguish between rocks following one another. The rocks fall, one by one, along a predetermined path and momentarily contact bristles 17 and 18. A current from the power source in the device 46 passes through the fragment contacting the brushes, and the device 46 provides a signal indicative of the fragment resistance in accordance with the current flow through the fragment. The signal is applied to discriminator 48, and if it is of a predetermined value, the timing stage 51 is actuated. Stage 51 then provides a signal to control valve 23 initiating a blast of air as the same fragment passes in front of nozzle 22.

Certain important factors should be noted in connection with the apparatus of FIGURES 1 and 2. The water reservoirs 30 and 31 and the water contained therein must be electrically insulated from one another. It is obvious that the measurement of fragment resistance would be impaired or rendered useless if there was a low resistance electrical path from one brush to the other through the water reservoirs or the water source. Thus, it may be desirable to insulate floats 36 and 37, or to use insulating conduit. Also, where the water comes from a common source for both reservoirs, to avoid a path being formed by the water as the reservoirs are being filled, it may be desirable to use larger reservoirs and to fill them when the apparatus is not sorting. Alternately the reservoirs could be kept filled from a common source by a dripping of the water from the source into the reservoir. This would avoid a conductive path being formed via the water supply. It will be realized that it may be convenient or perhaps desirable to avoid completely the making of an electrical path through the water supply, however it is not essential to avoid such a path. It is necessary, if such a path exists, to ensure that the resistance of the path is sufficiently higher than the resistances being determined that the resistance determination is not affected. The electrical resistance of such a path could be increased by increasing the length of the water path.

It should be noted that in general the fragments being sorted should be surface dry and preferably clean. Surface water on the fragment would provide another path for the current from the brushes and generally may impair the resistance determination. However, in certain cases where the resistance of the ore is much less than the specific resistance of the surface water and where the waste resistance is higher than the water resistance, then the fragments may be sorted satisfactorily. Some examples of the sorting of wet fragments are given hereinafter. Dirt on the fragments is undesirable because it may accumulate on the wet bristles of the brushes and after a while may begin to affect the resistance determination.

It will be apparent that the ore or rock fragments being sorted by the apparatus of FIGURES 1 and 2 have certain limitations as to size. The fragments must not be so small that they pass between the spaced terminating ends of the bristles 17 and 18. The fragments, on the other hand, must not be so large that they strike the solid parts of the brushes or so large that they engage the bristles so close to the solid parts of the brush as to damage the bristles. Considerable latitude in size is practical, and limits may be readily determined in practice for ranges of smaller size fragments and larger size fragments. As one example only, it has been found that, for smaller sizes of fragments, a fragment range separated by ½ inch and 1½ inch screens, is readily and accurately sorted. It should be noted that the fragment size has only a minor effect on the resistance determination. While resistance is affected by the length of the resistive path, the resistive path does not necessarily extend to the extreme edge of the fragment, apparently because of the point at which the fragment engages the brush. In any case, the variation in the resistance value determined caused by different sizes appears to be of minor significance when compared to the difference in resistance values between ore and waste.

In the sorting of rock fragments according to their resistance, it is of course desirable to obtain consistent resistance measurements. An important factor in obtaining consistent readings is the contact resistance between the rock fragment and the contacting members. For example, if two test prods having single points were used to contact a rock fragment and measure resistance, the resistance reading obtained would vary greatly between measurements made with the prods in different places, and would also vary with different pressures used on the prods. This appears to be largely due to the contact resistance included in the measurement. It is possible that the large inconsistencies in resistance measurement when single contact points are used, would be acceptable in sorting rock fragments where the ore and waste had resistance values differing by more than the inconsistencies introduced by the contact resistance. In such cases it would be conceivable to use as an alternative to the apparatus of FIGURES 1 and 2, an apparatus in which brushes 20 and 21 were replaced by a pair of flexible metallic arms to make contact with the fragments. However, such an alternative embodiment would not be suitable for the vast majority of resistance sorting operations.

Another alternative would be to use brushes 20 and 21 having flexible metallic bristles 17 and 18. No conducting liquid would be required. It has been found that this increases the number of contact points with respect to single point contact, and reduces the inconsistencies due to contact resistance. Nylon bristles having a conducting coating could also be used. Such alternatives do not provide results that are as satisfactory as the preferred embodiment of FIGURES 1 and 2, where the water from bristles 17 and 18 coats portions of the surface of the fragment to provide contacts extending over spaced areas of the fragment.

FIGURE 3 shows another alternative embodiment. In this embodiment the brushes are replaced by cylindrical rollers 54 and 55 of sponge-like material, rotatably mounted on axles 56 and 57, respectively, and extending transversely to the predetermined path of the body and on opposite sides of the path. The axles 56 and 57 are hollow and are filled with a supply of conducting liquid such as water. A plurality of holes 58 through the axles permit the water to saturate the sponge-like material of rollers 54 and 55. As before, conductors 44 and 45 connect a resistance measuring device to the rollers 54 and 55.

The operation of the FIGURE 3 embodiment is the same as that of the embodiment of FIGURES 1 and 2, except that contact with the fragments is made by the rollers rather than by brushes. It is believed further description is unnecessary.

Referring now to FIGURES 4 and 5, ore sorting apparatus is shown which sorts ore fragments moving through it in a wide path random stream. The expression "wide path" as used herein is intended to mean a path of travel having sufficient width to permit a plurality of the bodies using it to move along the path in side by side relationship. That is, it is intended to distinguish from a path where the bodies using it travel in single row alignment. The term "random stream" as used herein is intended to mean a plurality of objects or bodies moving in a given direction and having a haphazard alignment and spacing.

In the following description the wide path random stream extends in a straight line. That is, a cross-section taken through the stream at right angles would show the stream as straight. It is intended, however, that the wide path stream could be uniformly curved, and in fact, where required, could be a uniformly curved line closing on itself to form a circle. In other words, in an apparatus having a hopper feeding out bodies of material onto a cone shaped path directing means, the path followed by the bodies down the cone would be considered as a wide path random stream.

In FIGURES 4 and 5 there is shown a hopper 60 holding a quantity of ore or rock fragments 14. The rock fragments are moved downwards through opening 61 onto a vibrating table 62 suspended by springs 63. A number of supporting springs 63 are used but only a limited number are indicated in FIGURE 5 for simplicity of drawing. A connecting member 64 joins vibrating table 62 to a vibrating motor 65. The vibrating motor 65 may also have spring support. Such vibrating table feeders are well known in the art. The vibration of table 62 tends to distribute the fragments over the surface of the table and at the same time to cause the fragments to move down the sloping table surface in a wide path random stream. The rate of feed onto the table is such that the fragments are all in contact with the table as they move down its surface. A wide path feeder such as this is described, for example in a copending United States patent application Serial No. 206,095, of James F. Hutter et al., filed June 28, 1962, now Patent No. 3,179,247, and assigned to the assignee of this application.

As the bodies reach the end of table 62 they drop onto a trajectory plate or guiding plate 66. The guiding plate 66 has a steep slope and the fragments move down the surface of plate 66 under the influence of gravity. The guiding plate 66 serves to direct the fragments into the sorting zone in a predetermined wide path.

Mounted in the sorting zone in side by side relationship are a plurality of brushes 67–76. The brushes 67–76 are all mounted to one side of the predetermined path of the fragments extending across the width of the path and each has flexible bristles which extend into the predetermined path. The brushes have a predetermined center spacing and the bristles defining adjacent edges or portions of adjacent brushes are spaced from one another.

A water reservoir is provided for each brush. The water reservoirs are the same as those in the FIGURE 1 and 2 embodiment. One reservoir is shown in detail in FIGURE 5 and is designated 77. A wick extends from each reservoir to a respective brush. The wicks are indicated in FIGURE 4 as 78–87. The wicks provide a supply of water on the bristles of each brush.

A plurality of fluid nozzles 90–98, each having a fluid control valve, are mounted in the sorting zone adjacent the path of the fragments and below the brushes 67–76. The nozzles are substantially centered vertically between a pair of brushes. That is, nozzle 90 is substantially centered between brushes 67 and 68, nozzle 91 is substantially centered between brushes 68 and 69, and so on. The nozzles extend the width of the fragment path, as shown. The nozzles are each connected through a control valve to a source of fluid under pressure. The fluid is conveniently air under pressure. Such a plurality of nozzles and associated control valves are described in the aforementioned United States application Serial No. 206,095, now Patent No. 3,179,247. It will be seen that each unit consisting of a nozzle and control valve is the same as the nozzle and control valve unit of the embodiment of FIGURES 1 and 2.

The resistance determining means (not shown in FIGURES 4 and 5) used in the embodiment of FIGURES 4 and 5 is also the same as in the embodiment of FIGURES 1 and 2. There is, therefore, for each nozzle a resistance measuring device, an amplitude discriminator and a timing stage. Each resistance measuring device is connected with a pair of adjacent brushes which form a coacting pair. That is, one resistance measuring device is connected with coacting brushes 67 and 68, another with coacting brushes 68 and 69, and so on. Similarly, the timing stage deriving its signal from brushes 67 and 68 would actuate the control valve 90, and so on.

It will be recalled that each resistance measuring device includes a D.C. power supply. In the embodiment of FIGURES 4 and 5 a brush such as brush 68 will have two resistance measuring devices connected to it—one resistance measuring device from brush 67 to 68 and one from brush 68 to 69. The power supplies in the two resistance measuring devices should be arranged so that a common polarity is connected to brush 68. In other words, the power supplies should be arranged so that alternating polarities exist on adjacent brushes.

As before a splitter plate 25 is mounted below the nozzles 90–98 to separate the non-deflected and the deflected fragments, and belts 26 and 27 may be provided to carry the fragments to a required destination.

It is believed that the operation of the embodiment of FIGURES 4 and 5 will be clear. Briefly, the fragments 14 move down the vibrating table 62 in a random wide path stream. The fragments fall onto a guiding plate 66 and move down it under the influence of gravity. The fragments 15 shoot off the end of plate 66 in a predetermined wide path and each fragment contacts a pair of coacting brushes. The wet brushes provide a good contact and the resistance of each fragment is determined and a signal derived indicative of the resistance. If the signal is of a predetermined value, a timing stage opens a control valve to direct a blast of air from a nozzle immediately in line with the fragment path from the coacting brushes and the fragment is deflected.

It will be apparent that the size of the fragments being sorted should be sufficiently large that the fragment will touch at least two brushes or the resistance of the fragment will not be determined.

As an alternative embodiment to FIGURES 4 and 5, the plurality of brushes could be arranged in pairs as in FIGURES 1 and 2. Of course, where opposing brushes are used, the brush on one side could be made as a single brush extending the width of the path while the brushes on the opposite side could be mounted in side-by-side relationship across the width of the path.

In order to provide a better understanding of the invention the following tables are included showing various ores and resistance values of dry fragments associated with them as measured by apparatus of this invention using brushes with water as the conductive liquid. The values given include the resistance of the water on the bristles of the brushes. The tables are not intended to be exhaustive and include a few ores by way of example only. The resistance values given for the different ores and waste are for samples from a particular ore body and for use with the apparatus of the invention. These values are intended only as a guide and should not be considered as values which would necessarily be associated with similar ore and waste obtained from other ore bodies. The column headed "cut-off" shows a resistance value at which the amplitude discriminator may be set.

TABLE I

| Type of Mine | Type of Ore | Resistance Range of Ore | Type of Waste | Resistance Range of Waste | Cut-Off |
| --- | --- | --- | --- | --- | --- |
| Nickel | {Garnierite<br>Laterite} | 2.5–5.0M<br>0.5–0.8M | }Peridotite | 30–200M | 10M |
| Limestone | Limestone | 4.5–100M | Chert | 0.1–5.0M | 5M |
| Diamond | Blue ground | 30–60K | {Quartzite<br>Dolerite} | 11–150M<br>7.5–125M | } 1M |
| Gold | Quartz | 75–200M | Greenstone | 2.5–75M | 75M |
| Iron | Specular hematite | 70–500K | Silica | 2–22M | 1M |
| Copper | Chalcopyrite | 30–50K | Gabbro | 5–15M | 1M |
| Molybdenum | Molybdenite | 40–70K | Pegmatite | 12–15M | 1M |

Where $M$ = megohm or ohm × 1,000,000; $K$ = ohm × 1,000.

It will be seen from the preceding table that in most cases there is a marked difference between the resistance values associated with the ore and with the waste in a particular ore body. This difference is normally sufficient that inconsistencies which might still exist in apparatus according to the invention and which might be attributed to contact resistance or to differences in length of the resistive path measure, can be neglected.

With certain types of ores, surface treatment of the ore may increase the difference between the resistance value of the ore and that of the waste. For example, treating the limestone ore with an acid increases the conductivity.

As was previously mentioned, certain ores may have their resistance determined for sorting while the ore fragments are wet. The following Table II gives some resistance values determined for wet fragments using the apparatus of the invention and including the conducting liquid path. These values are intended only to illustrate that sorting of wet fragments is quite possible with certain types of ore fragments. The table is not complete and shows only values for certain samples of ore by way of example.

TABLE II

| Type of Mine | Type of Ore | Resistance Range of Ore | Type of Waste | Resistance Range of Waste | Cut Off |
|---|---|---|---|---|---|
| Nickel | Garnierite | 150K–250K | Peridotite | 350K–700K | 300K |
|  | Laterite | 130K–200K |  |  |  |
| Diamond | Blue Ground | 70–80K | Quartzite | 300–700K | 150K |
|  |  |  | Dolerite | 250–700K |  |
| Copper | Chalcopyrite | 30–50K | Gabbro | 150–450K | 100K |

In the embodiments of the invention described herein the D.C. resistance of the fragments or other bodies of material was measured. It is, of course, possible to use an alternating current or A.C. supply in the resistance measuring device and to determine the impedance of the bodies of material being measured. This may be desirable for specific materials, but a determination of D.C. resistance is satisfactory for most materials and is preferred.

Referring now to FIGURES 6 and 7, there is shown another apparatus for determining the resistance of ore fragments and for sorting ore fragments moving in a wide path random stream. Much of the apparatus is similar to that of FIGURES 4 and 5. The basic difference is that conductive liquid jets replace the brushes. Therefore, the embodiment of FIGURES 6 and 7 would require less maintenance as no brush replacement would be necessary.

As before, hopper 60, vibrating table 62, and guide plate 66 serve to direct a wide path random stream of fragments 14 through a resistance determining zone in a predetermined path. Just below the lower end of plate 66 and set back a short distance from the fragment path are a row of liquid nozzles 100–110, of conducting material, mounted by an insulating means. In FIGURE 7, nozzle 110 is shown mounted to plate 66 by a bracket 111 and an insulator 112. The other liquid nozzles are mounted in a similar manner each having an ejection axis or jet axis intersection the fragment path. A tube of insulating material, a plastic material for example, connects each liquid nozzle to a liquid reservoir 114. FIGURE 7 shows nozzle 110 connected to reservoir 114 by a plastic tube 115. A coil 116 may be provided in tube 115 to lengthen the liquid path as will be discussed hereinafter. Thus, a conducting liquid or conductive liquid from reservoir 114 is conducted separately to each of the nozzles 100–110 which direct separate liquid jets into the fragment path.

A plurality of fluid nozzles 117–121 are mounted adjacent the fragment path and below nozzles 100–110. The nozzle arrangement is shown in a preferred form in FIGURE 7 where liquid nozzles 101, 103, 105, 107 and 109 are positioned above the centers of rejection nozzles 117, 118, 119, 120 and 121 respectively. The other liquid nozzles 100, 102, 104, etc. are positioned above the junctions or edges of the rejection nozzles.

It will be seen that there are shown in FIGURE 6 more of the conducting liquid jet forming nozzles 100–110 per rejection nozzle 117–121 than there are shown in FIGURE 4 of the conducting brushes 67–76 per rejection nozzles 90–98. It is of course easier to define a small liquid jet for contacting fragments than it is to define the bristles contacting the fragments, and the jets do not need to be as large. Consequently more of the jets are used and the apparatus of FIGURES 6 and 7 is able to process smaller fragments or to process equivalent sizes more accurately. It will, however, be apparent that the nozzles 100–110 in FIGURES 6 and 7 could be arranged in a manner similar to the brushes of FIGURES 4 and 5. It will also be apparent that the numbers of nozzles 100–110 and nozzles 117–121 could be extended or reduced to cover a path of a required size.

Still referring to FIGURES 6 and 7, each of the nozzles 117–121 is connected through a control valve 123–127 respectively, to a source of fluid under pressure. This is similar to the apparatus of FIGURES 4 and 5.

Referring now to FIGURE 8, the electrical circuit of the apparatus is indicated schematically. Resistance measuring devices 130–139, which include a D.C. supply, are each connected to a pair of adjacent nozzles of nozzles 100–110. That is, resistance measuring device 130 is connected to nozzles 100 and 101, resistance measuring device 131 is connected to nozzles 101 and 102, and so on. The nozzles at the junctions of the rejection nozzles, i.e. nozzles 100, 102, 104, 106, 108 and 110, may be connected as at 155 to be at a common potential as shown, and the power supplies in the measuring devices arranged to have the same polarity connected to the respective ones of nozzles 101, 103, 105, 107 and 109. Amplitude discriminators 140–149 are connected respectively to measuring devices 130–139. The outputs of the amplitude discriminators are connected to timing stages 150–154, so that an output from either of amplitude discriminators 140 or 141 will operate the timing stage 150, and an output from either of discriminators 142 or 143 will operate timing stage 151, and so on. The timing stages 150–154 in turn provide a control signal to a respective one of control valves 123–127 to open and close the valve as a fragment passes in front of a respective rejection nozzle 117–121. It will be seen that the electrical portion just described is basically the same as that in the embodiment of FIGURES 4 and 5.

The operation of the embodiment of FIGURES 6, 7 and 8 will be apparent. The fragments 14 slide down the guide plate 66 and fall off the end. The fragments pass immediately in front of the nozzles 100–110 in a wide path random stream and jets of a conductive liquid strike the fragments. The nozzles 100–110 are on the same side of the fragment path as the guide plate, and as a result the variation in the length of the conducting jet striking a fragment is minimized. In other words, the guide plate 66 directs the fragments in a path which is substantially a uniform distance from the tips of the nozzles 100–110. The thickness of different fragments has substantially no effect on the length of the conducting jets.

It is possible to arrange the nozzles on opposite sides of the fragment path, staggered with respect to one another so that the jets do not strike one another in the center of the path. That is, the jets and nozzle axes must be non-intersecting. However, such a staggered arrangement introduces an undesirable factor as the length of conducting jets striking a fragment would vary with changes in fragment thickness. The arrangement shown is therefore preferred.

When a fragment passes in front of two adjacent nozzles and is struck by the liquid jets from these nozzles, an electric circuit is formed from a resistance measuring device to one nozzle, through the conductive liquid jet from that nozzle, through the fragment, through the conductive liquid jet from the other nozzle, to the other nozzle itself and back to the measuring device. A determination of fragment resistance is made and this is used to accept or reject the fragment as before.

It will be apparent that the resistance measured will include the resistance of the two jets between the respective nozzles and the fragment. It is important that the variations in the jet path distance and in the corresponding jet resistance should be small compared to the ratio of resistance of ore to waste. As mentioned before, the variation is minimized by the preferred nozzle arrangement. In addition, the lower the resistance of the jet path, the smaller will be the influence of these variations. Two factors determine the unit resistance of the jets—the cross section area of the jet and the conductivity of the liquid concerned.

The jet orifice, which governs the cross section of the jet, can only be increased to a limited extent. As the orifice size is increased, the liquid traces made on the fragment by the jets increase in width. If the jet traces merge they provide a liquid path on the surface of the rock fragment which would impair the determination of fragment resistance. As an example only, it has been found that a convenient orifice size range is between about 0.02–0.05 inch in diameter. With an orifice of 0.03 inch diameter, and with a liquid pressure of about 2–5 p.s.i., the jet leaves a liquid trace having a width of about ⅛ to 3/16 inch after a 12-inch fall. This could be used with a spacing between adjacent jets of about 5/16 inch or more. It will be seen that the orifice size may be increased or decreased considerably beyond the range given as an example. The orifice size selected would depend on various other factors such as the jet spacing, fragment size, and others. The primary consideration in making a selection is that the jet traces should not merge.

The conductive liquid used may be ordinary water, or water with various salts such as sodium chloride added to provide the required conductivity. While the resistance of water varies quite considerably in various parts of the country, as an example, tap water may have a resistance of about 2 megohms per centimeter of path when using an orifice of 0.03 inch in diameter at a pressure of 3 p.s.i. A sodium chloride solution 5 percent by weight reduced the resistance of the same jet path to about 10,000 ohms per centimeter.

It will be seen that ordinary water having a resistance as given in the above example would be suitable for use in determining the resistance of many ores. For example, chalcopyrite has a resistivity of less than 100 ohms while waste associated with it may have a resistivity of 50–100 megohms. If the liquid jet forming nozzles were spaced fairly close to the path of the fragments as they normally would be, the jet length would perhaps be of the order of one centimeter or less from each nozzle. This could give a jet path resistance with the water of the example of about 4 megohms. The resistance cut-off of the amplitude discriminator could then be set somewhat higher than 4 megohms and the effect of the jet path resistance would be negligible. In cases where the difference in resistance between ore and waste is not as great, it may be necessary to lower the resistivity of the liquid by adding salts.

It should be explained here that there is a conducting path from adjacent nozzles through the liquid in respective tubes 115 and the liquid in reservoir 114, but that this path does not impair the resistance determination. If the path resistance were low, that is if it were comparable to the resistances being determined, it would have an adverse effect on the determination. The path resistance is therefore made high enough to avoid any adverse effect. With ordinary water in tubing about 1/16 inch, the resistance might be of the order of 10 megohms or more per foot. It will be seen that there is no problem in increasing the length of the tubing until the path resistance is sufficiently high. Coiling the tube 115 as at 116 in FIGURE 7 may lengthen the path. As the fluid is made more conductive it may be necessary to increase the length of the tubing.

It will be recalled that with the apparatus of FIGURES 1–5, the rock fragments to be sorted were preferably dry but that certain types of fragments could have their resistance determined while wet on the surface. This is so with the apparatus of FIGURES 6–8 also. It is a convenience to be able to sort rock fragments that are wet because it is very desirable to wash the fragments before sorting for more efficient sorting. Many base metal ores having a low resistance may have their resistance determined for sorting while surface wet.

It has been found that the surface water path on a high resistance waste rock may be in the range of 0.1 to 0.5 megohm, while the metal sulfides of the ore give a low resistance path that may be in the range of 1 to 100 ohms. By using a more conductive liquid for the jet path, for example of the order of 10,000 ohms (about 5% NaCl solution) it is possible to make a satisfactory distinction between the ore and the waste. The traces made by the salty water of the jets do not merge on the moist surface of the fragment during the rapid passage of the rock in front of the jets. This passage may be at the rate of 10 milliseconds per inch travel. Consequently satisfactory sorting of wet rock may be achieved.

The increased resistance due to polarization which might be expected with D.C. on nozzles in a salt solution, does not appear to affect the results. It is thought that perhaps the high speed of the liquid eliminates the normal hydrogen and oxygen gas build up which is the main cause of polarization.

It is believed that the embodiments of the invention described herein and the examples given are typical. The invention provides a simple and inexpensive apparatus for determining the resistance of moving bodies of material, and also apparatus for sorting on the basis of the determined resistance. Various modifications and variations to the embodiments described can be made without departing from the true invention which is defined in the appended claims.

We claim:

1. In an apparatus for determining the resistance of irregularly shaped bodies of material moving through a resistance determining zone, handling means for introducing the bodies of material in single row alignment into the upper part of said sorting zone for movement therethrough under the influence of gravity in a predetermined path, a pair of brushes mounted in said zone on opposite sides of said path and having bristles extending into said path, the brushes being mounted with the bristles being inclined inwardly and downwardly in the direction of said path and the bristles of said brushes having terminating ends spaced from one another, a water reservoir for each said brush, said reservoirs being electrically insulated one from the other, water conducting means for each said brush extending from a respective reservoir to a respective brush to provide a supply of water on the bristles of each brush, and a measuring device having an electrical supply and being connected with the bristles of each said brush for determining the electrical resistance of a body of material contacting the bristles of each said brush.

2. In an apparatus for determining the resistance of irregularly shaped bodies of material moving through a resistance determining zone, the combination comprising handling means for introducing said bodies of material in single row alignment into the upper part of said zone for movement therethrough under the influence of gravity in a predetermined path, a pair of brushes mounted in said zone on opposite sides of said path and having bristles extending into said path, the brushes being mounted with their bristles inclined inwardly and downwardly in the direction of said path and the bristles of each said brush having terminating ends spaced from one another, a water reservoir for each said brush,
    said reservoirs being electrically insulated one from the other,
a wick extending from each said brush to a respective one of said water reservoirs to provide a supply of water on the bristles of each brush, and
a measuring device having a D.C. electrical supply and being connected with the bristles of each said brush for determining the electrical resistance of a body of material contacting the bristles of each said brush.

3. In an apparatus for determining the resistance of bodies of material moving in a wide path random stream through a resistance determining zone,
path defining means directing the bodies of material through said zone in a predetermined wide path,
a plurality of brushes positioned adjacent said path extending across the width of the path and having bristles extending into said path,
the brushes being arranged in co-acting pairs with the bristles of each brush in a pair being spaced from the bristles of the other brush in the pair,
a water reservoir,
water conducting means extending from said reservoir to each said brush to provide a supply of water for the bristles of each brush,
    the water conducting means and the reservoir being so constructed and arranged that the brushes in said co-acting pairs are electrically insulated from one another, and
a measuring device having an electrical supply for each said pair and being connected with the bristles of each said pair for determining the electrical resistance of a body of material contacting the bristles of each brush in said pair.

4. In an apparatus for determining the resistance of irregularly shaped bodies of material moving through a resistance determining zone, the combination comprising
handling means for introducing said bodies of material in a wide path random stream into the upper part of said zone for movement therethrough under the influence of gravity in a predetermined path,
a plurality of brushes positioned in side by side relationship in said zone extending across the width of said path with the bristles of the brushes extending into said path,
    adjacent brushes in said plurality of brushes constituting a co-acting pair of brushes,
a water reservoir for each said brush,
    said reservoirs being electrically insulated one from the other,
a wick for each said brush extending from each said brush to a respective one of said reservoirs to provide a supply of water on the bristles of each brush, and
a measuring device having a D.C. electrical supply for each said co-acting pair of brushes and each being connected with the bristles in a co-acting pair of brushes for determining the resistance of a body of material contacting the bristles of each brush in the respective pair.

5. Apparatus as defined in claim 3, in which the wide path extends in a straight line.

6. Apparatus as defined in claim 3, in which the wide path extends in a uniformly curved line.

7. Apparatus as defined in claim 3, in which the wide path extends in a curved line closing on itself to form a circle.

8. Apparatus for sorting bodies of material moving through a sorting zone comprising
handling means for introducing bodies of material into the upper part of said zone for movement therethrough under the influence of gravity in a predetermined path,
at least one pair of co-acting brushes mounted adjacent said zone and having flexible bristles with body contacting end portions extending into said path,
    the bristles of each of said brushes being spaced from one another,
a water reservoir for each said brush,
water conducting means extending from each said reservoir to a respective brush to provide a supply of water on the bristles of each brush,
a resistance measuring means connected with said pair of brushes providing a signal indicative of the resistance of each body of material contacting the bristles in a pair of brushes,
a fluid nozzle having a control for fluid flow therethrough,
    said nozzle being positioned adjacent said path so that said bodies of material pass it after passing said brushes, and
means responsive to a signal of predetermined value from said resistance measuring means actuating said control for fluid flow and initiating fluid flow through said nozzle to deflect a body of material from its path.

9. Apparatus for sorting ore fragments moving through a sorting zone, comprising
handling means for introducing ore fragments in single row alignment into the upper part of said zone for substantially free fall therethrough in a predetermined path,
a pair of brushes mounted in said zone on opposite sides of said path and having flexible bristles with fragment contacting end portions extending into said path,
said brushes being mounted with their bristles being inclined inwardly and downwardly in the direction of said path and the bristles of each said brush having terminating ends spaced from one another,
a water reservoir for each said brush,
    said reservoirs being electrically insulated one from the other,
a wick for each said brush extending from each said brush to a respective one of said water reservoirs to provide a supply of water on the bristles of each said brush,
a resistance measuring means including a D.C. supply connected with said brushes providing a signal indicative of the resistance of each fragment contacting the bristles in each brush,
a fluid nozzle having a control for fluid flow therethrough,
    said nozzle being positioned adjacent said path so that said fragments pass it after passing said brushes, and
means responsive to a signal of a predetermined value from said resistance measuring means actuating said control for fluid flow and initiating fluid flow through said nozzle to deflect an ore fragment from its path.

10. Apparatus for sorting ore fragments each having an individual value of electrical resistance moving through a sorting zone, comprising
a wide path feeder delivering a wide path random stream of fragments to the upper part of said zone for substantially free fall therethrough in a predetermined wide path,
a plurality of brushes mounted in said zone in side by side relationship extending across the width of said path and each having flexible bristles extending into said path,
    said brushes having a predetermined center spacing and the bristles defining adjacent edges of adjacent brushes being spaced from one another,
    adjacent brushes in said plurality of brushes constituting a coacting pair of brushes,
a water reservoir for each said brush,
    said reservoirs being electrically insulated one from the other, a wick for each brush extending from a respective brush to a respective one of said water reservoirs to provide a supply of water on the bristles of each brush, a resistance measuring means including a D.C. supply for each said coacting pair of brushes and each being connected with the bristles in each brush of a coacting pair providing a signal indicative of the resistance of each fragment contacting the bristles of each brush in the respective pair, a fluid nozzle having a control for fluid flow therethrough for each pair of coacting brushes, the nozzles being mounted in side by side relationship in said sorting zone adjacent said path and extending across the width of said path, the nozzles being positioned so that the fragments pass the nozzles after passing the brushes, each nozzle being substantially centered with the space between adjacent edges of adjacent brushes in a respective coacting pair of brushes, and means for each said coacting pair of brushes responsive to a signal of a predetermined value from a respective resistance measuring means actuating said control for fluid flow and initiating fluid flow through a respective nozzle to deflect an ore fragment from its path.

11. Apparatus for sorting ore fragments each having an individual value of electrical resistance moving through a sorting zone, comprising a wide path feeder delivering a wide path random stream of fragments to the upper part of said zone for substantially free fall therethrough in a predetermined wide path, a single brush mounted in said zone on one side of said path extending across the width of the path and having flexible bristles extending into said path, a plurality of smaller width brushes mounted in said zone in side by side relationship on the opposite side of said path to the single brush, extending across the width of the path and having flexible bristles extending into said path, said smaller width brushes having a predetermined center spacing and the bristles defining adjacent edges of adjacent brushes being spaced from one another, a water reservoir for each said brush, said reservoirs being electrically insulated one from the other, a wick for each said brush extending from a respective brush to a respective one of said water reservoirs to provide a supply of water on the bristles of each brush, a resistance measuring means including a D.C. supply for each said smaller width brushes and each being connected with the bristles in a respective one of said smaller width brushes and the bristles in said single brush for providing a signal indicative of the resistance of each fragment contacting the respective bristles, a fluid nozzle having a control for fluid flow therethrough for each pair of coacting brushes, the nozzles being mounted in side by side relationship in said sorting zone adjacent said path and extending across the width of said path, the nozzles being positioned so that the fragments pass the nozzles after passing the brushes, each nozzle being substantially centered with the space between adjacent edges of adjacent brushes in a respective coacting pair of brushes, and means for each said coating pair of brushes responsive to a signal of a predetermined value from a respective resistance measuring means actuating said control for fluid flow and initiating fluid flow through a respective nozzle to deflect an ore fragment from its path.

12. Apparatus for determining the electrical resistance of moving bodies of material, comprising means for directing the bodies of material in a predetermined path, a conductive liquid reservoir, at least a pair of conducting nozzles mounted adjacent said path and each having an ejection axis intersecting said path, said ejection axes being non-intersecting with respect to one another, insulative tubing for each said nozzle connecting each said nozzle to said reservoir to provide conductive liquid jets extending from each said nozzle into said predetermined path, and a measuring device connected with each said nozzle for measuring the resistance of bodies of material passing said nozzles.

13. Apparatus for determining the electrical resistance of bodies of material moving through a resistance determining zone, comprising handling means for introducing said bodies of material into the upper part of said zone for movement therethrough under the influence of gravity in a predetermined path, a conductive liquid reservoir, at least a pair of conducting nozzles mounted adjacent said path in side by side spaced relationship and each having an ejection axis intersecting said path, the ejection axes of said nozzles being non-intersecting, insulative tubing for each of said nozzle connecting each said nozzle to said reservoir to provide conductive liquid jets extending from each said nozzle into said path for impingement on said bodies, and a measuring device having a D.C. electrical supply and being connected with the nozzles for determining the electrical resistance of bodies of material passing said nozzles.

14. Apparatus for sorting ore fragments each having an individual value of electrical resistance moving through a sorting zone, comprising a wide path feeder delivering a wide path random stream of fragments to the upper part of said zone for substantially free fall therethrough in a predetermined wide path, a conductive liquid reservoir mounted higher than said zone, a plurality of conducting nozzles insulatively mounted adjacent said path in side by side relationship extending across the width of said path and each having an ejection axis intersecting said path, the ejection axes of said nozzles being non-intersecting, adjacent nozzles in said plurality of nozzles constituting a coacting pair of nozzles, insulative tubing for each said nozzle connecting each said nozzle to said reservoir to provide conductive liquid jets extending from each said nozzle into said path for impingement on said bodies, a measuring means having a D.C. electrical supply for each of said coacting pairs of nozzles and each being connected with the respective coacting pair for providing a signal indicative of the resistance of each fragment impinged by jets from said conducting nozzles of the respective pair, a plurality of fluid flow rejection nozzles each having a control for fluid flow therethrough, said rejection nozzles being mounted in side by side relationship in the sorting zone adjacent said path and extending across the width of said path, said rejection nozzles being positioned so that fragments pass the rejection nozzles after passing the conducting nozzles, each said rejection nozzle being associated with at least one of the coacting pairs positioned above it, and means for each coacting pair responsive to a signal of predetermined value from a respective resistance measuring means actuating said control for fluid flow on an associated rejection nozzle for initiating fluid flow therethrough to deflect an ore fragment from its path.

15. A method for sorting ore fragments moving through a sorting zone, comprising providing a stream of ore fragments in the sorting zone, directing the fragments in a predetermined path through said zone, providing conductor members each including a conductive liquid for making electrical contact with said fragments, contacting each fragment at spaced parts on the surface thereof by said conductive liquid of two conductor members, obtaining a measurement of resistance for each fragment through the conductive liquid contacting the spaced parts on the surface thereof as the fragments move along the path, comparing the measurement with a reference and providing a signal indicative of the comparison, directing an air blast across another portion of the path to change the path of the fragments impinged thereby, and controlling the initiation and termination of the air blast in response to the said signal.

References Cited by the Examiner

UNITED STATES PATENTS

| | | | |
|---|---|---|---|
| 2,101,381 | 12/1937 | Appleyard | 209—81 |
| 2,131,930 | 10/1938 | Appleyard et al. | 209—81 |
| 2,609,094 | 9/1952 | Fry | 209—81 |
| 3,075,641 | 1/1963 | Hutter | 209—111.7 X |

FOREIGN PATENTS 494,092   5/1930   Germany.

ROBERT B. REEVES, *Primary Examiner.*